Sept. 12, 1961      I. E. WITWICKA ET AL      2,999,753
PROCESS FOR PRODUCING A PROTEINOUS FOOD PRODUCT
Filed Oct. 13, 1958      3 Sheets-Sheet 1

INVENTORS
IRENA WITWICKA
JOHN S. PAVUK
BY KENNETH M. GAVER

Jerome R. Cox
ATTORNEY

Sept. 12, 1961     I. E. WITWICKA ET AL     2,999,753
PROCESS FOR PRODUCING A PROTEINOUS FOOD PRODUCT
Filed Oct. 13, 1958     3 Sheets-Sheet 3

INVENTORS
IRENA WITWICKA
JOHN S. PAVUK
BY KENNETH M. GAVER

ATTORNEY

United States Patent Office 2,999,753
Patented Sept. 12, 1961

2,999,753
PROCESS FOR PRODUCING A PROTEINOUS FOOD PRODUCT
Irena E. Witwicka, Montreal, Quebec, and John S. Pavuk and Kenneth M. Gaver, Preville, Quebec, Canada, assignors to The Ogilvie Flour Mills Company, Limited, Montreal, Quebec, Canada, a corporation of Canada
Filed Oct. 13, 1958, Ser. No. 766,865
3 Claims. (Cl. 99—14)

The invention disclosed and claimed in this application relates to food products and to processes of forming them. It is illustrated by processes of compounding such food products and by examples of the food products obtained by such processes. One of the principal embodiments of our invention is a process of mixing a hydrolyzed vegetable protein (which contains salt) with a yeast, causing the autolysis of the mixture and drying.

Another embodiment is the autolysis of yeast with or without added proteins and the mixing of the autolysate with hydrolyzed vegetable protein. Other embodiments include the food products obtained.

It is known that yeast may be autolyzed in several ways including the mixing of the yeast with salt. It is also known that yeast may be mixed with various proteins such as gelatin, skim milk, and the like. Normally the products obtained by such prior art processes have a characteristic and sometimes objectionable yeasty flavor and odor.

One of the objects of our invention is the provision of a new food product rich in amino acids, and vitamins of the B-complex, and having a very pleasant flavor.

A further object of our invention is the provision of a new food product having the pleasing and valuable qualities mentioned above formed from a combination of yeast and hydrolyzed vegetable protein (H.V.P.) (such as the liquid product left over from the manufacture of glutamic acid from gluten) in which the yeasty characteristic flavor of the yeast is masked by the H.V.P. and in which the salty taste of the H.V.P. is eliminated by the yeast.

Further objects of the invention include the provisions of valuable and pleasing food products which are synthesized by the above processes.

Further objects and features of our invention will appear from a reading of the following specification when considered in connection with the accompanying drawings and claims.

In the drawings we have shown as embodiments several processes according to our invention which produce several products constituting other embodiments of our invention.

Figure 1:
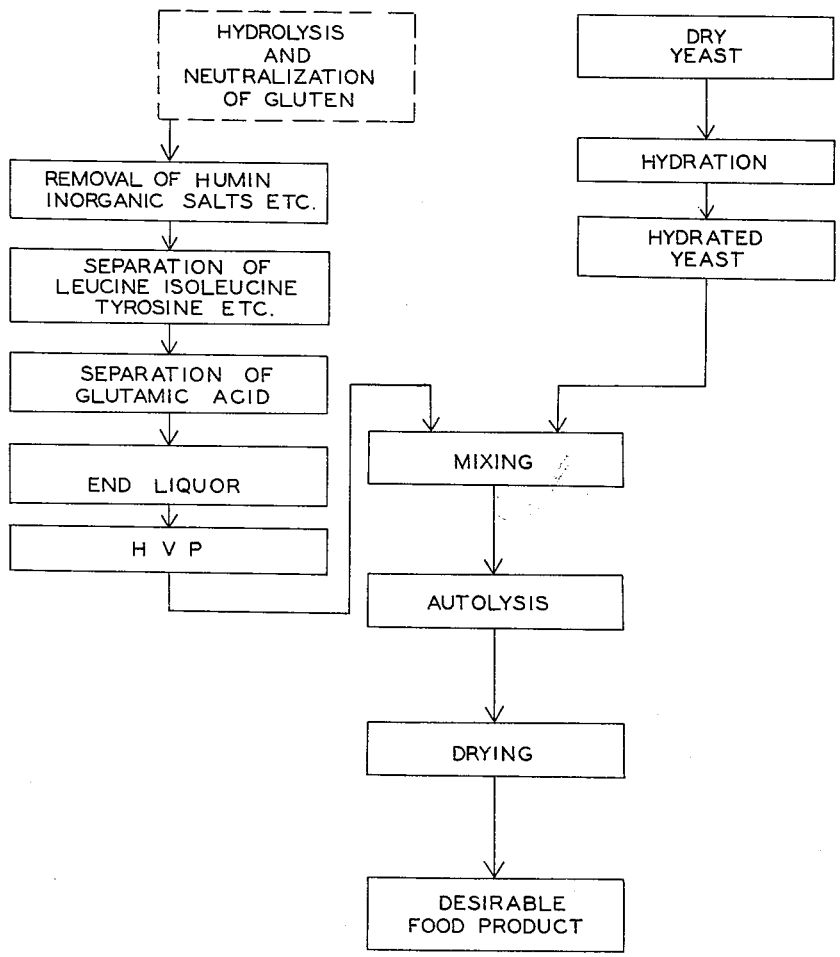
FIG. 1 is a flow sheet of a process constituting one embodiment of our invention.

Referring to the drawings for further explanation of our invention, it may be seen that we have shown in FIGURE 1 a flow sheet of a process which constitutes an illustrative embodiment of our invention. Therein hydrolyzed gluten (containing salt) is obtained in any convenient practical way. Several ways are indicated in the dotted box in the upper left hand part of the sheet and are explained more thoroughly in United States Patents of Kenneth M. Gaver, Alfred M. Barton and Allan A. Eisenbraun, Numbers 2,828,336 and 2,831,889, patented March 25, 1958, and April 22, 1958, respectively.

We prefer to obtain the hydrolyzed vegetable protein (H.V.P.) in the following manner as described in said Patents 2,828,336 and 2,831,889, and in a co-pending application of Kenneth M. Gaver and Allan A. Eisenbraun, Serial No. 729,066, filed April 17, 1958, although other methods of obtaining such H.V.P. are obviously usable.

We prefer first to remove humin, inorganic salt, other impurities, etc. Then we prefer to separate various amino acids such as leucine, isoleucine, tyrosine, etc. Then we acidify to the isoelectric point of glutamic acid and separate out the glutamic acid. All of the above is explained more thoroughly in said Patent 2,828,336 and in patent application Serial No. 729,066.

In the separation of the glutamic acid the filtrate after the separation of leucine, isoleucine, tyrosine, etc., is acidified to the isoelectric point of glutamic acid. Thereupon the glutamic acid is crystallized out and separated. The end liquor left at this point has a pH of about 3.0–3.2.

To obtain hydrolyzed vegetable protein therefrom we increase the pH to at least 5 as by the addition of sodium hydroxide and we treat to reduce the ammonia content. We prefer to follow a portion of the processes of Example I or Example II of the above mentioned application Serial No. 729,066, as follows:

We prefer to adjust the end liquor to a pH of 10.7–10.8 by the addition of caustic soda (sodium hydroxide), then to warm the adjusted end liquor to temperatures ranging from 100°–175° F. under vacuum for between about 8 and about 20 hours to reduce the ammonia content to the 0.01–0.05% range or below, and then to neutralize to a pH of from 5.5 to 5.6 with hydrochloric acid. We thus obtain our H.V.P. In lieu of alkalizing, heating, and neutralizing, we may neutralize the end liquor from its pH of 3.0–3.2 to a pH between 5.0–7.0 (e.g. 5.5) by the addition of sodium hydroxide and then warm to a temperature of 100°–175° F. for from 8–20 hours under vacuum to eliminate the ammonia.

The adjustment of the pH to an approximately neutral pH and the elimination of ammonia improves the taste of the food product and facilitates the drying of the subsequently formed autolyzed yeast-end liquor mixture. It should be noted, however, that we prefer to use the neutralized end liquor after removal of ammonia in the making of our improved food products without drying such liquor. This neutralized and pretreated glutamic acid end liquor we call hydrolyzed vegetable protein (H.V.P.).

Hydrated yeast is also obtained in any practical convenient manner. Our preferred way of obtaining this hydrated yeast is by taking dry yeast and hydrating it. The hydrolyzed vegetable protein is then mixed with the hydrated yeast. The autolysis of the yeast is induced by the salt in the hydrolyzed vegetable protein. After autolysis, the autolysate is dried in any convenient manner. We prefer to dry by vacuum evaporation or by spray drying.

Figure 2:
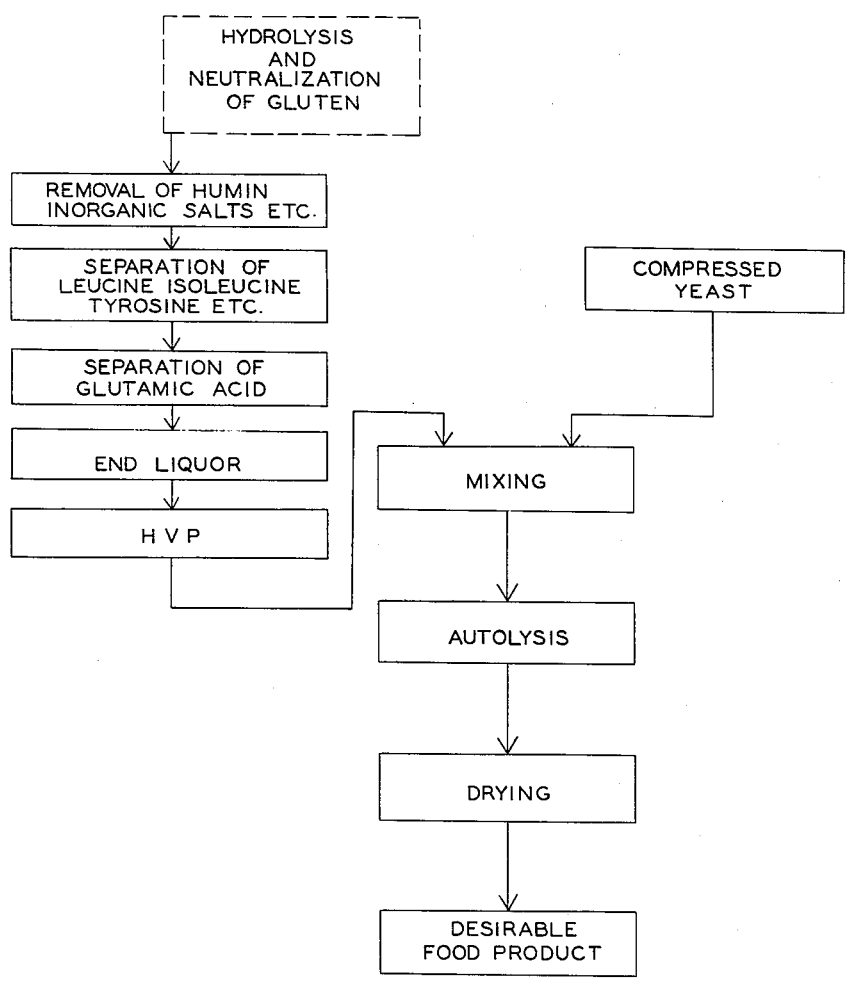
FIG. 2 is a flow sheet of another process constituting another embodiment of our invention.

In FIGURE 2 we have shown an alternative process. Therein instead of using dry yeast and hydrating, we use compressed yeast and mix directly with the hydrolyzed vegetable protein.

Figure 3:
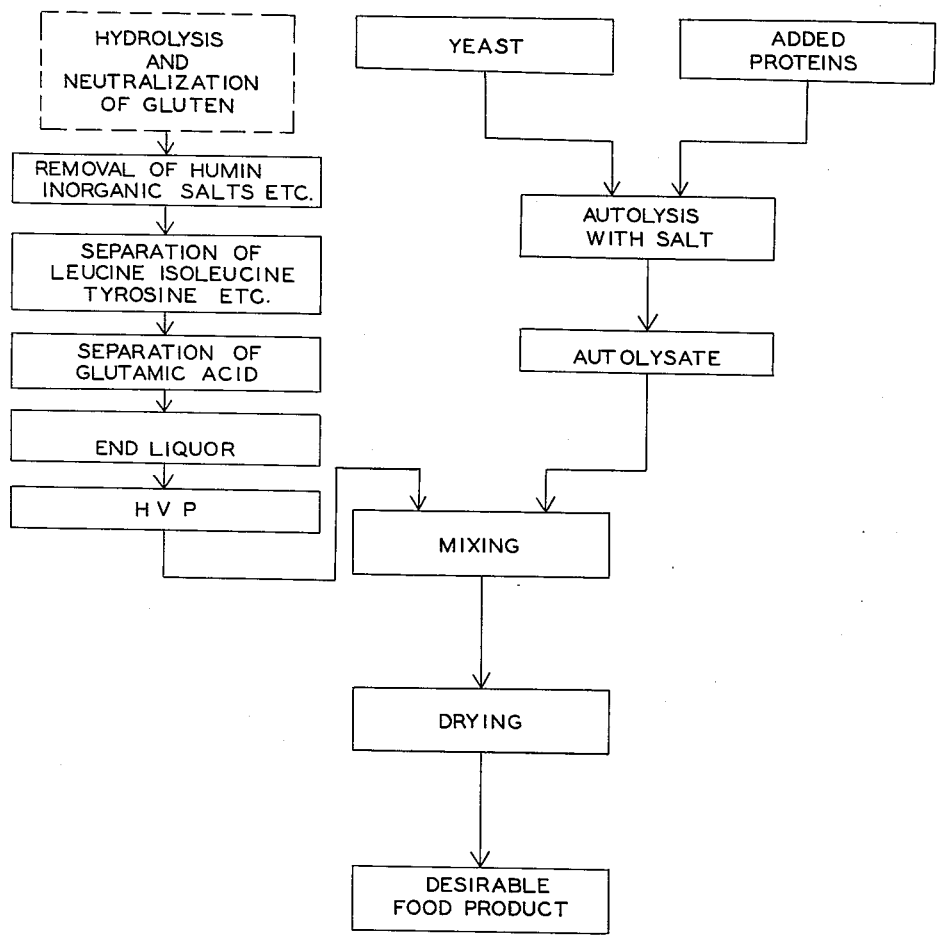
FIG. 3 is a flow sheet showing another process constituting another embodiment of our invention.

In FIGURE 3 we illustrate an alternative process in which we add various proteins such as gelatin or skim milk, etc. to yeast and autolyze the mixture with salt. We then mix the autolysate thoroughly with hydrolyzed vegetable protein.

Following are examples of the carrying out of our invention.

EXAMPLE I 1000 g. of compressed yeast (27% solids) was admixed with 1000 ml. of processed H.V.P. (1250 grams) and autolysis allowed to proceed with agitation at room temperature for 4 hours. Half of the autolysate was vacuum evaporated to a paste containing approximately 75% solids, and the other half was spray dried to a tan powder.

Analysis of the powder indicated:

| | | |
|---|---|---|
| Solids | percent | 95 |
| Protein | do | 51.25 |
| Total nitrogen | do | 9.18 |
| Amino nitrogen | do | 8.35 |
| Salt | do | 31.25 |

Vitamins (mcg./gram):

| | |
|---|---|
| Thiamine | 16 |
| Riboflavin | 20 |
| Niacin | 147 |
| Pantothenic acid | 41 |
| Pyridoxine | 10 |
| Folic acid | 7 |
| Biotin | 1 |
| Choline | 760 |
| Inositol | 495 |

*Amino acids (percent)*

| | |
|---|---|
| Alanine | 2.2 |
| Arginine | 2.5 |
| Aspartic acid | 2.3 |
| Cystine | 1.0 |
| Glutamic acid | 6.3 |
| Glycine | 1.8 |
| Histidine | 1.4 |
| Isoleucine | 2.0 |
| Leucine | 2.9 |
| Lysine | 2.4 |
| Methionine | 1.3 |
| Phenylalanine | 2.5 |
| Proline | 6.3 |
| Serine | 2.2 |
| Threonine | 0.9 |
| Tryptophane | 0.2 |
| Tyrosine | 1.0 |
| Valine | 2.4 |

EXAMPLE II 1000 g. of dry active yeast was hydrated 3½ hours with 2000 ml. of water and then autolyzed by the addition of 3000 ml. (3750 g.) of processed H.V.P. The autolysis occurred in 20–30 minutes but was allowed to proceed for 2 hours. Half of the autolysate was vacuum evaporated to a paste, and the other half was spray dried to a tan powder. Analysis of the powder indicated:

| | | |
|---|---|---|
| Solids | percent | 95 |
| Protein | do | 57.7 |
| Total nitrogen | do | 9.3 |
| Amino nitrogen | do | 6.9 |
| Salt | do | 28.8 |

Vitamins (mcg./gram):

| | |
|---|---|
| Thiamine | 20 |
| Riboflavin | 24 |
| Niacin | 180 |
| Panthothenic acid | 50 |
| Pyrodoxine | 12 |
| Folic acid | 8 |
| Biotin | 1 |
| Choline | 800 |
| Inositol | 590 |

*Amino acids (percent)*

| | |
|---|---|
| Alanine | 2.2 |
| Arginine | 2.4 |
| Aspartic acid | 2.4 |
| Cystine | 1.0 |
| Glutamic acid | 6.1 |
| Glycine | 1.9 |
| Histidine | 1.3 |
| Isoleucine | 2.1 |
| Leucine | 2.9 |
| Lysine | 2.4 |
| Methionine | 1.3 |
| Phenylalanine | 2.4 |
| Proline | 6.8 |
| Serine | 2.3 |
| Threonine | 2.3 |
| Tryptophane | 0.2 |
| Tyrosine | 1.1 |
| Valine | 2.3 |

Both spray dried products were light tan in color, possessed a pleasant taste and aroma. When cooked in water, a bouillon-like soup is obtained without the yeasty flavor characteristics of the autolyzed yeast and without the strong salty flavor characteristic of most H.V.P. products.

The usual salt autolysis of yeast may also be carried out in the presence of other materials such as gelatin, skim milk and the like, and then combined with processed H.V.P. prior to spray drying. The added proteins, in this case, are more or less broken down by the enzymes released from the yeast, and the extent of breakdown is more or less controlled by the amount of protein material added. The exact proportion of ingredients used is governed by the flavor desired.

EXAMPLE III

One thousand grams of compressed yeast was admixed with 250 grams of spray dried skim milk. The autolysis was initiated with a little salt. After two hours the autolysate was mixed with 1250 grams of processed H.V.P. and spray dried. The product possessed a flavor somewhat approximating creamy mushrooms and should find acceptance for gravies and creamed sauces.

Properly purified (debittered) brewer's yeast has also been used. If brewer's yeast is used in the moist form, it contains about 27% solids and does not need to be hydrated. On the other hand, if obtained in the dry form, it should be hydrated in the same manner as explained above in Example II.

The yeast used in the above examples was the usual baker's yeast (*Saccharomyces cerevisiae*). We have also used dry active yeast. Compressed yeast has also been used. The compressed yeast contains approximately 27% solids while the dry yeast used contained approximately 95% solids with the following approximate composition.

*Yeast analysis*

| | | |
|---|---|---|
| Solids | percent | 95.0 |
| Protein | do | 65.0 |
| Total nitrogen | do | 10.5 |
| Amino nitrogen | do | 4.8 |
| Ash | do | 10.0 |

Vitamins (mcg./gram):

| | |
|---|---|
| Thiamine | 50 |
| Riboflavin | 60 |
| Niacin | 450 |
| Pantothenic acid | 125 |
| Pyridoxine | 30 |
| Folic acid | 20 |
| Biotin | 3.5 |
| Choline | 2300 |
| Inositol | 1500 |

*Amino acids (percent)*

| | |
|---|---|
| Alanine | 2.9 |
| Arginine | 2.2 |
| Aspartic acid | — |
| Cystine | 0.8 |
| Glutamic acid | 4.6 |
| Glycine | — |
| Histidine | 0.8 |
| Isoleucine | 3.3 |
| Leucine | 4.0 |
| Lysine | 3.9 |
| Methionine | 1.4 |
| Phenylalanine | 2.2 |
| Proline | — |

| | |
|---|---|
| Serine | — |
| Threonine | 2.3 |
| Tryptophane | 0.6 |
| Tyrosine | 2.5 |
| Valine | 2.9 |

The hydrolyzed vegetable protein used is that liquid obtained according to the procedure described in patent application Serial No. 729,066 but before spray drying. It had an approximate composition as follows:

| | | |
|---|---|---|
| Solids | percent | 44.0 |
| Protein | do | 23.50 |
| Total nitrogen | do | 3.76 |
| Ammonia nitrogen | do | 0.120 |
| Amino nitrogen | do | 3.64 |
| Salt | do | 20.5 |

*Amino acids (percent)*

| | |
|---|---|
| Alanine | 0.8 |
| Arginine | 1.1 |
| Aspartic acid | 1.4 |
| Cystine | 0.5 |
| Glutamic acid | 1.9 |
| Histidine | 0.7 |
| Isoleucine | 0.6 |
| Leucine | 1.0 |
| Lysine | 0.7 |
| Methionine | 0.5 |
| Phenylalanine | 1.1 |
| Proline | 4.3 |
| Serine | 1.4 |
| Threonine | 1.0 |
| Tryptophane | 0.0 |
| Tyrosine | 0.1 |
| Valine | 0.9 |
| Glycine | 1.2 |

Our new article of manufacture comprises the product of the autolysis of yeast with a salt containing processed hydrolyzed vegetable protein optionally followed by spray drying.

The product possesses a very pleasant flavor resembling somewhat that of mushroom with the yeast contributing a meat-like flavor while the H.V.P. successfully masks the characteristic flavor and odor of the yeast. The product is very rich in amino acids as well as the vitamins of the B-complex and should therefore be a valuable adjunct to various foods such as soups, gravies, meats.

It is to be understood that the above embodiments of our invention are for the purpose of illustration only and various changes may be made therein wtihout departing from the spirit and scope of our invention.

We claim:

1. A process for producing food products from end liquor obtained in processes for glutamic acid recovery from protein hydrolysates which comprises: alkalizing glutamic acid end liquor with sodium hydroxide, heating the resulting liquor under vacuum until the ammonia has been substantially completely eliminated, neutralizing the deammoniated liquor with hydrochloric acid, mixing moist yeast with between about 3.5 and about 4.5 parts by weight of said neutralized liquor per part by weight yeast solids, storing the resulting mixture until autolysis of the yeast is substantially complete, and drying the resulting mixture.

2. A process for producing food products from end liquor obtained in process for the recovery of glutamic acid from wheat gluten hydrolysates which comprises: alkalizing glutamic acid end liquor to a pH of about 10.7 with sodium hydroxide, heating the alkaline liquor under vacuum at a temperature between about 100° F. and about 175° F. until ammonia has been eliminated, adjusting the deammoniated liquor to a pH of about 5.5, mixing between about 3.5 and about 4.5 parts by weight of said adjusted liquor with moist yeast containing one part by weight yeast solids, agitating the resulting mixture for about 4 hours while the yeast autolyzes, and drying the resulting mixture.

3. A process for producing food products from end liquor obtained in processes for the recovery of glutamic acid from protein hydrolysates which comprises: alkalizing glutamic acid end liquor with sodium hydroxide to a pH of about 10.7; heating the resulting liquor under vacuum at a temperature between about 100° F. and about 175° F. until substantially all the ammonia has been removed therefrom; adjusting the pH of the deammoniated liquor to about 5.5 with hydrochloric acid; mixing about 125 parts by weight of the adjusted liquor with an autolysate mixture prepared by combining about 100 parts by weight of yeast of about 27% by weight solids content, spray dried skim milk, and sufficient salt to initiate autolysis of yeast; and drying the resulting mixture.

References Cited in the file of this patent

UNITED STATES PATENTS

| | | |
|---|---|---|
| 1,611,531 | Kahn et al. | Dec. 21, 1926 |
| 1,702,303 | Kahn | Feb. 19, 1929 |
| 2,141,455 | Weizmann | Dec. 27, 1938 |
| 2,217,264 | Weizmann | Oct. 8, 1940 |